United States Patent [19]
Cloughley et al.

[11] Patent Number: 5,871,757
[45] Date of Patent: Feb. 16, 1999

[54] STABILIZATION OF POLYUNSATURATES

[75] Inventors: John B. Cloughley; David F Horrobin, both of Guildford, United Kingdom

[73] Assignee: Scotia Holdings PLC, England

[21] Appl. No.: 628,692

[22] PCT Filed: Oct. 18, 1994

[86] PCT No.: PCT/GB94/02277

§ 371 Date: Oct. 16, 1996

§ 102(e) Date: Oct. 16, 1996

[87] PCT Pub. No.: WO95/11289

PCT Pub. Date: Apr. 27, 1995

[30] Foreign Application Priority Data

Oct. 18, 1993 [GB] United Kingdom ............... 9321479

[51] Int. Cl.$^6$ .............. A61K 7/48; A61K 35/78
[52] U.S. Cl. .............. 424/401; 514/549; 426/651; 424/195.1
[58] Field of Search .............. 424/401, 195.1; 514/549; 426/651

[56] References Cited

FOREIGN PATENT DOCUMENTS

| 0 296 117 | 12/1988 | European Pat. Off. . |
| 0 302 769 | 2/1989 | France . |
| 1 200 450 | 7/1970 | United Kingdom . |
| 89/02223 | 3/1989 | WIPO . |

OTHER PUBLICATIONS

Lofty, M. et al. "The antioxidant properties of Garden Cress . . . " The Journal of the American Oil Chemists' Society, vol. 34, pp. 96–100.

Toyama, K. et al. "The protection of marine products from deterioration due to the oxidation . . . " Bulletin of the Japanese Society of Scientific Fisheries, 39(8) (1973), pp. 891–898.

Deans, S.G. et al. "Promotional effects of plant volatile oils . . . " Age, vol. 16, 1993, pp. 71–74.

Database WPI Week 9344, Derwent Publications Ltd., London, GB, An 9303486685 & JP, A, 5 255 692 (Fuji Oil Co Ltd) 5 Oct. 1993, abstract.

Wada, S. et al. "The synergistic antioxidant effect of rosemary extract and . . . " Journal of Food Processing and Preservation, vol. 16, No. 4, 1992, Trumbull, US, pp. 263–274.

Revankar, G.D. et al. "Anti–oxidant effect of a spice mixture . . . ", vol. 11, No. 1, 1974, pp. 31–32.

*Primary Examiner*—Jyothsna Venkat
*Attorney, Agent, or Firm*—Nixon & Vanderhye

[57] ABSTRACT

Polyunsaturated oils such as triply or higher ethylenically unsaturated organic materials are stabilized against ambient temperature atmospheric oxidation by the addition of an essential oil such as thyme oil, oregano oil, pepper oil or clove oil.

14 Claims, No Drawings

STABILIZATION OF POLYUNSATURATES

The invention relates to the stabilisation of polyunsaturates, that is to say triply or more highly ethylenically unsaturated organic materials, and especially to essential fatty acids of this class.

Essential fatty acids (EFAS) are nutrients, which are essential for health and well being, and like vitamins must be ingested, since they cannot be synthesised in the body. They are found in vegetable seed oils, fish oils and other natural sources and are readily susceptible to spoilage by mild oxidation conditions such as by contact with atmospheric oxygen at ambient temperature. Antioxidants are required to protect these sensitive and labile materials.

Most vegetable oils which contain an n-6 EFA contain only linoleic acid which has two double bonds. However, some oils of vegetable, fungal or algal origin contain other, more unsaturated fatty acids such as gamma-linolenic acid (18:3 n-6, GLA), dihomo-gamma-linolenic acid (20:3 n-6, DGLA) and arachidonic acid (20:4 n-6, AA). Since susceptibility to oxidation is related to the number of double bonds, oils or purified compounds containing GLA. DGLA, or AA are highly susceptible to oxidation.

Oils from various sources frequently contain highly unsaturated fatty acids of the n-3 series, such as eicosapentaenoic acid (EPA. 20:5 n-3), docosapentaenoic-acid (DPA. 22:5 n-3) and docosahexaenoic acid (DHA, 22:6 n-3). These fatty acids are particularly susceptible to oxidation.

Most oils of natural occurrence, especially vegetable seed oils already contain antioxidants, most commonly phenolic compounds such as tocopherols. In some cases however, especially when the levels of natural antioxidants have been reduced by refining, by purifying or by other processing, it is advantageous to supplement residual antioxidants by the addition of like compounds of natural or synthetic origin. This is particularly important with natural vegetable, fungal or algal oils containing polyunsaturated fatty acids such as GLA and/or AA, and with marine oils containing EPA, DPA and DHA.

A quite different class of oils is formed by essential oils, extracted from a wide range of culinary and medicinal plants. They have been known from antiquity to possess important biological effects, and are principally known for their antifungal and antibacterial properties. Their defining characteristics are steam distillability and lipophilicity, and they are, usually, odorous mixtures of esters, aldehydes, alcohols, ketones and mono- and sesqui-terpenes of which the terpenes are particularly significant.

Recently it has been reported that whole essential oils have antioxidant effects in vivo (Deans, Noble & Svoboda, 1992). It has also been reported that specific methanolic extracts from some herbs can stabilise lard at 75° C. (Economou, Oreopoulou, Thomopoulas, 1991). Such extracts correspond only in part to essential oils, and the paper is primarily concerned in any case with stability in high temperature use, as in cooking oils. Furthermore it does not concern the triply and more highly ethylenically unsaturated fatty acids that are particularly valuable components in many natural oils and are highly susceptible to oxidation even at room temperature.

Another publication, in JP 5-255692 (Furn Seiyu KK), is of fats showing low absorption from the gut, in which the fatty acids comprise polyunsaturates, and among possible antioxidants is rosemary oil. This is no doubt one of the many processed and fractionated extracts available for use in foods and cooking oils. A still further report, by Toyama et al Bull.Jap.Soc. Sci. Fisheries 39 891–898(1973) is of fractionated citrus fruit oils containing above 90% terpenes being fairly effective in room temperature storage tests in flat fish off.

These publications, and for example others using citrus fruit oils for flavour masking in fish oil products, are unspecific. We have now however found that for the particular problem of long-term, ambient-temperature stabilisation of triply and more highly unsaturated materials, especially in pharmaceuticals where particular and individual materials are often required to be preserved for their specific effects and stability in terms of years may be required, there is particular value in the use of whole essential oils. As extracted, desirably from the vegetative parts of the oil-containing plant rather than fruits, the steam distillates form a natural and highly effective antioxidant system.

Accordingly, the invention provides a method of long-term ambient-temperature stabilisation of polyunsaturates, that is to say triply or more highly ethylenically unsaturated organic materials, and especially essential fatty acids, susceptible to atmospheric oxidation, which method comprises adding to the polyunsaturate at least one whole essential oil.

The invention further provides a composition constituting a pharmaceutical for application by any route, a topical preparation for the care or treatment of normal or diseased skin, or a nutritional supplement or a special food for human or veterinary use, which composition comprises a polyunsaturate stabilised according to the method set out above.

Valuable essential oils include those extracted from thyme, oregano, pepper and clove. Whole thyme oil, for example, can delay ambient-temperature oxidation of polyunsaturated fatty acids or their esters such as glyceride oils to give extended spoilage time under ordinary commercial conditions. Furthermore, the presence of endogenous primary antioxidant tocopherols and/or tocotrienols can further enhance the protective effect of the added essential oils. This has been found to be true also for added primary antioxidants, such as tocopherol, tocotrienol, ascorbic acid and derivatives, especially fat soluble derivatives such as ascorbyl palmitate.

The essential oils contain a wide range of volatile compounds, such as monoterpenes and sesquiterpenes. Although specific extracts such as rosmaric acid and apigenin have been identified as antioxidants, the present invention discloses for the first time the use of the whole essential oil as such in stabilising polyunsaturated essential fatty acids. The present invention is further distinguished from previous proposals concerned with glyceride oil stabilisation in that it is primarily concerned with long term stabilisation at ambient temperatures not for example with hot cooking oils, and with polyunsaturated fatty acids and their esters rather than more easily stabilised materials of lower degrees of unsaturation.

The stability of edible oils is usually judged by means of an accelerated test, conducted at 100° C. or above, that seeks to effect rapid oxidation. For oils designed for frying, baking or other culinary purposes this is realistic. However, if oils are specifically for storage and consumption at ambient temperatures, such as for nutritional supplements or for medicinal or pharmaceutical applications, such tests are not realistic. Not only does the oxidation mechanism change in character as the temperature is raised, but polyunsaturated acids in any case undergo chemical ranges at elevated temperatures that may have adverse effects on their biological properties. Accordingly, an, accelerated room temperature test has been developed which is appropriate to the evaluation of edible oils particularly susceptible to oxidation by atmospheric oxygen.

In this test, which is called the open dish test, oil is exposed in a thin layer to atmospheric oxygen at room or other temperature, usually in a Petri dish of 10 cm diameter. The rate of spoilage is measured by determining peroxide values periodically, usually over a period of several days. The time needed for the peroxide value to treble its original value is a useful quantitative comparative measure of rates of spoilage, and is known as $T_3$. It allows ready identification of effective amounts of the essential oils and primary antioxidants when used. Suitably the essential oil is added in an amount of the or each oil of from 0.001 to 10% by weight related to the polyunsaturate, preferably from 0.01 to 2%, and most preferably from 0.05 to 1% and the primary antioxidant is added in an amount of from 0.001 to 0.1% by weight related to the polyunsaturate, preferably 0.01 to 0.02%.

The invention is further illustrated by the following Examples.

EXAMPLES

Example 1

Freshly extracted unrefined evening primrose oil with a peroxide value (PV) of 8.2 oxidised progressively in the open dish test with a $T_3$ of 25 days. The addition of 0.05% of thyme oil from a commercial source extended the $T_3$ to 62 days.

Example 2

Fully refined evening primrose oil with an initial PV of 2.8, which contained only 100 ppm of residual endogenous total tocopherols, had a PV of 5.2 and a $T_3$ of 2 days in the open dish test. The addition of 0.1% oregano oil reduced the PV to 1.3 after 3 days and gave a $T_3$ of 11 days.

Example 3

Freshly extracted unrefined evening primrose oil with a peroxide value (PV) of 10.0 oxidised progressively in the open dish test with a $T_3$ of 24 days. The addition of 0.02% of thyme oil freshly prepared by hydrodistillation extended the $T_3$ to 35 days. Likewise, the alternative addition of 0.01% of ascorbyl palmitate extended the $T_3$ to 42 days. However, when both of these stabilisers were added simultaneously the $T_3$ was extended to about 110 days indicating significant synergism. If the extension of the $T_3$ has taken place on an additive basis, a $T_3$ of about 77 days at most would have been expected for the combination.

Example 4

Refined decolourised evening primrose oil with an initial PV of 1.8, which contained only 0.015 to 0.2% of residual total tocopherols, had a PV of 7.0 and a $T_3$ of 2 days in the open dish test. The addition of 0.1% thyme oil reduced the PV to 2.3 after 2 days and to 8.9 after 12 days exposure. The further simultaneous addition of 0.005% of a highly purified preparation of $\alpha$-tocopherol suppressed the increase of PV even more effectively, to 2.1 after 2 days and 4.5 after 12 days exposure.

Example 5

A freshly rendered fish oil with an original PV of 10.6 oxidised very rapidly in the open dish test, giving a $T_3$ of 5 days. The addition of 0.02% of oregano oil extended the $T_3$ to 10 days and that of 0.05% ascorbyl palmitate to 14 days. However, the addition of both of these substances simultaneously extended the $T_3$ to 50 days, demonstrating substantial synergism. If there had been no synergism, a $T_3$ of about 24 days might have been expected.

Example 6

A concentrate of gamma-linolenic acid, "GLA 70" has an original PV of 3.4. The concentrate contains 70% of GLA and no traces of native tocopherols, and is therefore much more susceptible to oxidation than natural products with smaller concentrations of the triply unsaturated fatty acid. In the open dish test it afforded a $T_3$ of 10 days which could be extended to 25 days by the addition of 0.5% of a pepper oil prepared by steam distillation and to 17 days by the addition of 0.05% of delta-tocopherol. However, when both of these additives were present simultaneously, the $T_3$ increased to 65 in contrast to the expected much shorter $T_3$ if the separate stabilisation effects of the two components had been merely additive.

Example 7

A concentrate of eicosapentaenoic acid, "EPA 50" containing 50% of this quintuply unsaturated essential fatty acid in the free acid form and no natural antioxidant immediately after manufacture, had a PV of 1.5. In the open dish test the extreme susceptibility of this polyunsaturated concentrate to oxidation was demonstrated in that after two days the PV was over 100. However when 0.1% of clove oil and 0.05% of alpha-tocopherol were added in the concentrate it was stabilised to such an extent that the PV after 2 days was only 2.6 and after 7 days was still less than 5.10.

Example 8

Ethyl esters derived from an oil extracted from fungal biomass rich in arachidonic acid and having no detectable tocopherol content increased rapidly in PV in the open dish test from an initial 3.4 to 75.5 after 3 days. The same oil after the addition of 0.05% of thyme oil and 0.02% of a commercially mixed tocopherol preparation had a 3-day PV of only 8.8 under the same conditions.

We claim:

1. A method of stabilizing naturally occurring polyunsaturated oils comprising triply or more highly ethylenically unsaturated organic materials against ambient temperature atmospheric oxidation, which method comprises adding to the polyunsaturated oil a combination of essential oils each added in an amount of from 0.001 to 10% by weight related to the polyunsaturated oil, said essential oils consisting of the extract obtained by steam distillation of the vegetative parts of the oil-containing plant.

2. The method according to claim 1, wherein the essential oil is selected from the group consisting of thyme oil, oregano oil, pepper oil and clove oil.

3. The method according to claim 1 wherein each of said essential oils is added in an amount of from 0.01 to 2% by weight related to the polyunsaturated oil.

4. The method according to claim 1 wherein each of said essential oils is added in an amount of from 0.05 to 1% by weight related to the polyunsaturated oil.

5. The method according to claim 1, wherein a primary antioxidant is also added to the polyunsaturated oil.

6. The method according to claim 5, wherein the primary antioxidant is added in an amount of from 0.001 to 0.1% by weight related to the polyunsaturated oil.

7. The method according to claim 6, wherein the primary antioxidant is added in an amount of from 0.01 to 0.02% by weight related to the polyunsaturated oil.

8. The method according to claim 5, wherein the primary antioxidant is selected from the group consisting of tocopherol, tocotrienol, ascorbic acid and derivatives thereof.

9. The method according to claim 8 wherein said derivatives are lipid soluble derivatives.

10. The method according to claim 1, wherein the polyunsaturated oil comprises organic materials selected from the group consisting of gamma-linolenic acid, dihomo-gamma-linolenic acid and arachidonic acid.

11. The method according to claim 1, wherein the polyunsaturated oil comprises organic materials selected from the group consisting of eicosapentaenoic acid, docosapentaenoic acid and docosahexaenoic acid.

12. The method according to claim 10 wherein the polyunsaturated oil is purified or refined.

13. The method according to claim 1 wherein the polyunsaturated oil has an increased concentration of fatty acids.

14. The pharmaceutical composition, topical cosmetic preparation or nutritional supplement for humans or animals comprising a polyunsaturated oil stabilized according to the method of claim 1.

* * * * *